United States Patent
Li et al.

(10) Patent No.: US 12,072,774 B2
(45) Date of Patent: Aug. 27, 2024

(54) BACKUP AND RESTORE VIA UNION MOUNT FILESYSTEM

(71) Applicant: Dell Products L.P., Round Rock, TX (US)

(72) Inventors: Alice Min Li, Shanghai (CN); Jun Zhan, Shanghai (CN); Kai Chen, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/956,407

(22) Filed: Sep. 29, 2022

(65) Prior Publication Data

US 2024/0095128 A1 Mar. 21, 2024

(30) Foreign Application Priority Data

Sep. 21, 2022 (CN) .......................... 202211154762.8

(51) Int. Cl.
*G06F 12/00* (2006.01)
*G06F 11/14* (2006.01)

(52) U.S. Cl.
CPC ...... *G06F 11/1464* (2013.01); *G06F 11/1469* (2013.01)

(58) Field of Classification Search
CPC .......................... G06F 11/1464; G06F 11/1469
USPC .......................................................... 711/154
See application file for complete search history.

(56) References Cited

U.S. PATENT DOCUMENTS

| | | | |
|---|---|---|---|
| 11,650,749 B1* | 5/2023 | Tran, V | G06F 3/067 711/165 |
| 2005/0066095 A1* | 3/2005 | Mullick | G06F 16/1774 710/200 |
| 2016/0217043 A1* | 7/2016 | Bailey | G06F 11/1451 |
| 2021/0103563 A1* | 4/2021 | Thirumalai | G06F 11/3055 |

FOREIGN PATENT DOCUMENTS

CN 104615387 A * 5/2015

* cited by examiner

*Primary Examiner* — Mardochee Chery
(74) *Attorney, Agent, or Firm* — Jackson Walker L.L.P.

(57) ABSTRACT

An information handling system may include at least one processor and a memory. The information handling system may be configured to store a first set of data comprising an operating system in a first location; store a second set of data comprising application data in a second location; expose the first and second sets of data in a combined union mount filesystem; and create a backup of the second set of data, but not the first set of data, by creating a copy of the second location.

19 Claims, 2 Drawing Sheets

BACKUP AND RESTORE VIA UNION MOUNT FILESYSTEM

TECHNICAL FIELD

The present disclosure relates in general to information handling systems, and more particularly to techniques for backing up and restoring data.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well as other contexts), information handling systems may execute virtual machines (VMs) for various purposes. A VM may generally comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

It is advantageous to be able to create a backup of an information handling system's data (e.g., a full backup of all its data, or a file-level backup of selected files and/or directories). In the event of an error, the system can then be restored to an earlier, known-good state. (Or a different system can be provisioned with the backed-up data to take the place of the failed system.) Current systems for backup up and restoring data tend to be complex and require significant manual intervention. Embodiments of this disclosure may provide a more seamless and simpler solution.

As discussed in more detail below, certain embodiments may leverage a filesystem service that implements a union mount filesystem. As one of ordinary skill in the art with the benefit of this disclosure will understand, a union mount filesystem may allow files and/or directories that are located on separate filesystems (e.g., on multiple physical storage resources, on separate partitions within a single physical storage resource, stored in multiple container files such as disk image files, etc.) to be overlaid and treated as a single filesystem. The underlying separate filesystems that are merged into the union mount filesystem may be referred to as "branches."

The different branches that make up a union mount filesystem may in some cases be either read-only or read/write filesystems. Thus any writes made to the union mount filesystem may be directed to a specific real filesystem. This allows the union mount filesystem to appear to be writable as a whole, but without actually allowing writes to one or more of the underlying filesystems.

One example of a union mount service that is implemented on Linux and certain other operating systems is UnionFS. Other embodiments may leverage different implementations of a union mount service.

Embodiments of this disclosure may be particularly advantageous in the context of backing up VMs or containers executing on an HCI node (also referred to as an HCI appliance). However, backup and/or restore mechanisms in accordance with this disclosure may be used in any information handling system.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with data backup and restoration may be reduced or eliminated.

In accordance with embodiments of the present disclosure, an information handling system may include at least one processor and a memory. The information handling system may be configured to store a first set of data comprising an operating system in a first location; store a second set of data comprising application data in a second location; expose the first and second sets of data in a combined union mount filesystem; and create a backup of the second set of data, but not the first set of data, by creating a copy of the second location.

In accordance with these and other embodiments of the present disclosure, a computer-implemented method may include storing a first set of data comprising an operating system in a first location of an information handling system; storing a second set of data comprising application data in a second location of the information handling system; the information handling system exposing the first and second sets of data in a combined union mount filesystem; and the information handling system creating a backup of the second set of data, but not the first set of data, by creating a copy of the second location.

In accordance with these and other embodiments of the present disclosure, an article of manufacture may include a non-transitory, computer-readable medium having computer-executable instructions thereon that are executable by a processor of an information handling system for: storing a first set of data comprising an operating system in a first location; storing a second set of data comprising application data in a second location; exposing the first and second sets of data in a combined union mount filesystem; and creating a backup of the second set of data, but not the first set of data, by creating a copy of the second location.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
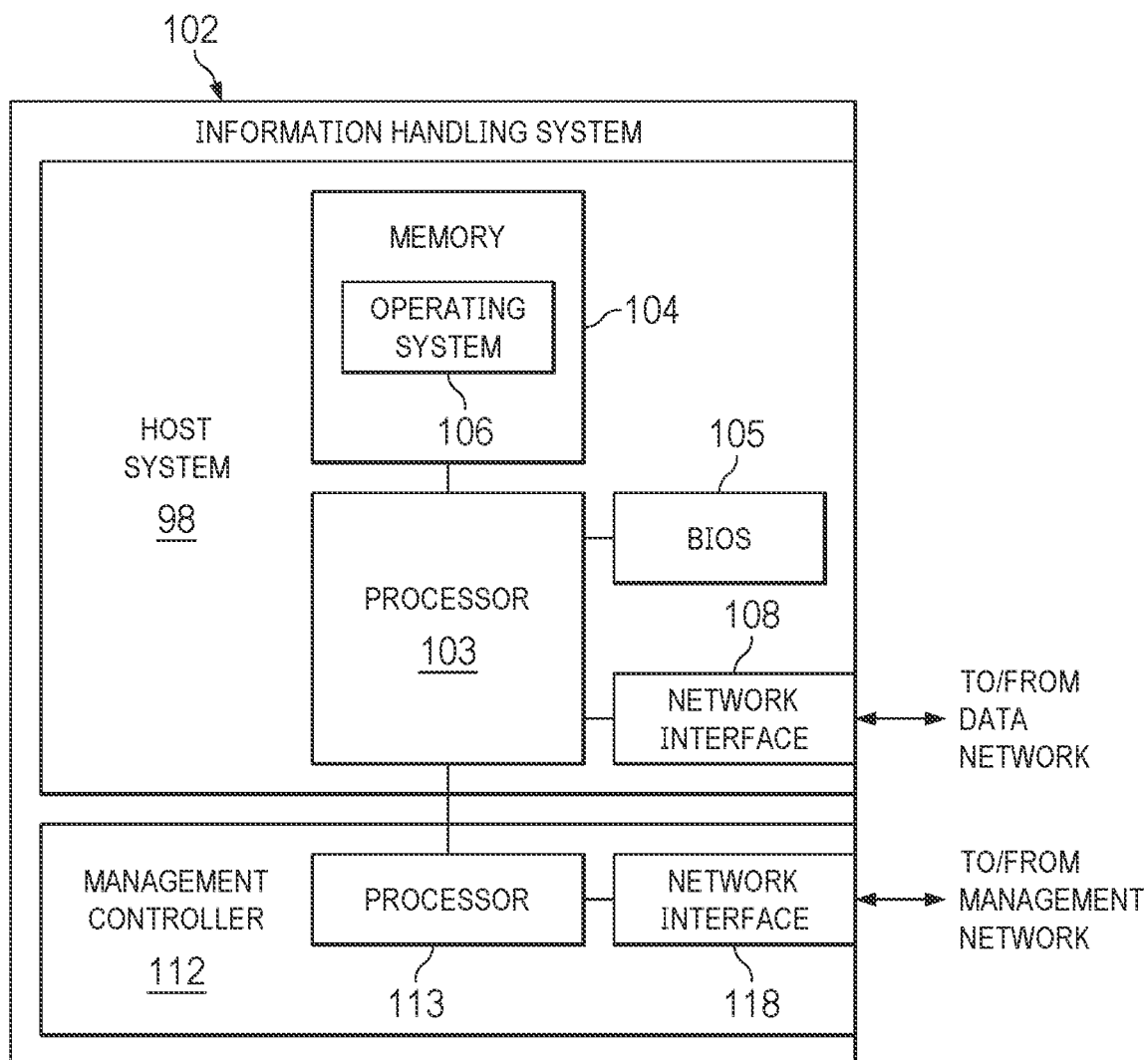
FIG. 1 illustrates a block diagram of an example information handling system, in accordance with embodiments of the present disclosure.
Figure 2:
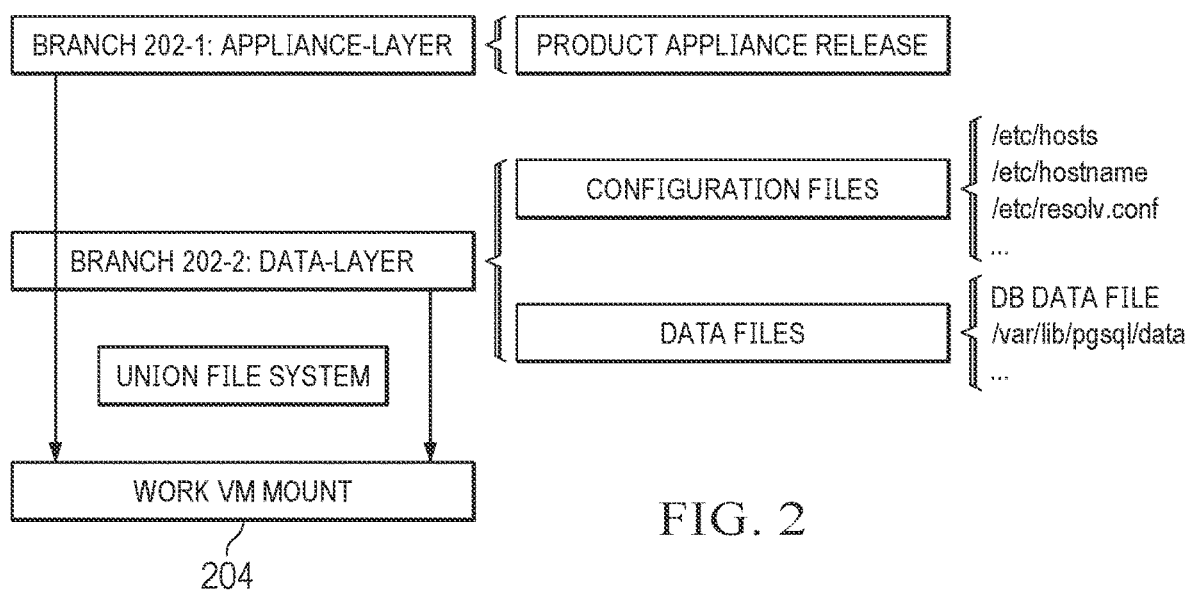
FIG. 2 illustrates a block diagram of an example HCI appliance, in accordance with embodiments of the present disclosure.

Preferred embodiments and their advantages are best understood by reference to FIGS. 1 and 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure provide techniques for backing up and restoring data in an information handling system such as an HCI appliance.

In general, a full backup may be used to create a clone of an entire appliance (e.g., including its hardware configuration information, operating system, VMs, microservices, applications, and data). A file-level backup is a backup solution for individual files and folders, typically used to save special folders or files instead of the whole image. When an error is encountered, either type of backup may be restored (e.g., onto the same appliance or onto a different appliance). In existing implementations, both the full backup and the file-level backup (and their associated restore techniques) have significant drawbacks.

Embodiments of this disclosure may configure an HCI appliance with a union mount filesystem in a way that enables simpler and more seamless backup and restore functionality.

FIG. 2 illustrates an example filesystem arrangement for an HCI appliance. Work VM mount 204 is the filesystem that is exposed to application programs running in the appliance. However, as shown, work VM mount 204 is in fact made up of branches 202-1 and 202-2 (collectively, branches 202), that have been combined via a union mount filesystem.

Branch 202-1 provides the appliance-layer storage, including the base system that is deployed on the node, hardware configuration information, operating system, microservices, applications, and other standard components.

Branch 202-2 provides the data-layer storage, including the configuration files and data files supporting the workloads executing on the node.

In other embodiments, more than two branches may be used. For example, the data-layer storage may be split into two or more individual branches that can be backed up and restored individually, etc.

In general, branches 202 may be implemented as separate partitions or namespaces, or they may be implemented as files in any suitable storage format (e.g., Open Virtual Appliance (OVA), Open Virtualization Format (OVF), Virtual Machine Disk (VMDK), etc.

Branches 202 may be overlaid into a union filesystem and exposed as work VM mount 204. In one embodiment, branch 202-1 may be mounted as read-only, because the base system may not need to be changed during normal operation. (During system upgrades and the like, it may be remounted as read-write to allow changes to be made when needed.) Branch 202-2 may be mounted as read-write, so that any data written to work VM mount 204 during normal operation (e.g., database writes, logging, etc.) will in fact be reflected in branch 202-2.

A backup solution according to this disclosure may provide the advantages of both full appliance backup and file-based backups. It requires minimal computing and storage resources, needs no special tooling and script support, and requires fewer manual steps overall for both backup and restore operations.

As mentioned above, any data that is changed or created during operation of the appliance may be stored in branch 202-2. Thus in one embodiment, such data may be entirely encapsulated in a single file (e.g., a VMDK file) that is independent of the base system, which is stored in a separate file. Thus a data-layer-only backup and restore may be implemented by copying the single file that contains the data layer.

The base system data in branch 202-1 is typically much larger than the data stored in branch 202-2. Backing up and restoring the base system in the appliance-layer branch 202-1 is typically not needed, and omitting such a backup saves time, storage resources, network bandwidth, etc.

The example of FIG. 2 illustrates an implementation with two branches, but any desired number of branches may be used in particular implementations. For example, any desired different categories of data may be stored in separate branches of the union filesystem, and the user may decide which branches are worth backing up. For example, the base system may be stored in a first branch, logs may be stored in a second branch, and databases and critical data may be stored in a third branch. The user may decide to back up just the third branch in one situation, and may accomplish this by making a copy of the file containing the third branch.

In other situations, the user may decide to back up both the second and third branches, and so the files the files containing both may be copied.

The backup processes described herein are simpler and more efficient than existing methods, requiring only the copying of a single file (or a small number of files, when more branches are used). The corresponding restoration process is equally simple and efficient.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a memory;
   wherein the information handling system is configured to:
   store a first set of data comprising an operating system in a first location;
   store a second set of data comprising application data in a second location;
   expose the first and second sets of data in a combined union mount filesystem; and
   create a backup of the second set of data, but not the first set of data, by creating a copy of the second location.

2. The information handling system of claim 1, wherein the information handling system is a hyper-converged infrastructure (HCI) appliance.

3. The information handling system of claim 1, wherein the first location is a first file, and the second location is a second file.

4. The information handling system of claim 1, wherein creating the backup comprises copying the second location to another information handling system via a network connection.

5. The information handling system of claim 4, wherein the another information handling system is configured to mount the backup.

6. The information handling system of claim 1, wherein the application data comprises a database and at least one configuration file.

7. A computer-implemented method comprising:
   storing a first set of data comprising an operating system in a first location of an information handling system;
   storing a second set of data comprising application data in a second location of the information handling system;
   the information handling system exposing the first and second sets of data in a combined union mount filesystem; and
   the information handling system creating a backup of the second set of data, but not the first set of data, by creating a copy of the second location.

8. The method of claim 7, wherein the information handling system is a hyper-converged infrastructure (HCI) appliance.

9. The method of claim 7, wherein the first location is a first file, and the second location is a second file.

10. The method of claim 7, wherein creating the backup comprises copying the second location to another information handling system via a network connection.

11. The method of claim 10, wherein the another information handling system is configured to mount the backup.

12. The method of claim 7, wherein the application data comprises a database and at least one configuration file.

13. An article of manufacture comprising a non-transitory, computer-readable medium having computer-executable instructions thereon that are executable by a processor of an information handling system for:
   storing a first set of data comprising an operating system in a first location;
   storing a second set of data comprising application data in a second location;
   exposing the first and second sets of data in a combined union mount filesystem; and
   creating a backup of the second set of data, but not the first set of data, by creating a copy of the second location.

14. The article of claim 13, wherein the information handling system is a hyper-converged infrastructure (HCI) appliance.

15. The article of claim 13, wherein the first location is a first file, and the second location is a second file.

16. The article of claim 13, wherein creating the backup comprises copying the second location to another information handling system via a network connection.

17. The article of claim 16, wherein the another information handling system is configured to mount the backup.

18. The article of claim 13, wherein the application data comprises a database and at least one configuration file.

19. The information handling system of claim 1, wherein the first and second sets of data are exposed in a combined UnionFS filesystem.

\* \* \* \* \*